Patented Feb. 22, 1949

2,462,817

UNITED STATES PATENT OFFICE 2,462,817

COPOLYMERS OF TETRA-ALLYL PENTAERYTHRITOL

Lee T. Smith, Philadelphia, Pa., assignor to the United States of America as represented by the Secretary of Agriculture No Drawing. Application April 26, 1946, Serial No. 665,039

6 Claims. (Cl. 260—85.7)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the copolymerization of allyl ethers of polyhydric alcohols such as diallyl ethylene glycol and allyl glycerine, and allyl ethers of sucrose, starch, cellulose, and other carbohydrates with unsaturated compounds such as the acrylates, the methacrylates, styrene, dienes, vinyl derivatives, and allyl esters, such as for instance allyl phthalate or allyl succinate.

Although the polymerization of allyl ethers such as those mentioned above is not catalyzed appreciably by use of organic and inorganic peroxides and per-compounds such as benzoyl peroxide and potassium perchlorate or persulfate, copolymerization is effected between the allyl ethers and the unsaturated compounds of the type set forth above when mixtures of the allyl ethers and other unsaturated materials are allowed to stand, or when the mixtures are heated with or without peroxide, persulfate, or perchlorate catalysts.

In order to form copolymers with desirable properties, the number of allyl groups per molecule must, in general, be two or more. Polyfunctional alcohols containing two or more hydroxyl groups should, in general, have an average degree of allylation of two, so that the corresponding allyl ether would form copolymers of the desired kind. However, mixtures having an average degree of allylation less than two are still satisfactory, providing a sufficient number of bi-functional or polyfunctional molecules are in the mixture.

The copolymerization may be brought about in mass by simply mixing the two monomers together, in solution in a common solvent, such as acetone, ethyl acetate, and so forth, or by making a water emulsion of the two monomers and then bringing about copolymerization with or without the aid of heat and catalysts. In addition, partially polymerized resins can be dissolved in a solution of polyallyl ethers which are already resins, such as allyl starch and allyl cellulose, and after application as a coating, an insoluble, infusible film is formed on baking.

These copolymerized materials have properties which differ from the corresponding polymers from each of the monomers used. In general, colorless and transparent resins of the insoluble, infusible type are formed. The properties of the final product will vary from a soft, rubbery mass to a hard, brittle material, depending on which allyl ether and which other unsaturated monomer is used, the ratio of the materials used, and the conditions under which the copolymerization is carried out. These copolymers have wide and extensive uses varying from protective coatings to molded articles.

The following examples, in which the proportions are in parts by weight, are given by way of illustration and not in limitation.

Example I 10 parts of tetra-allyl pentaerythritol, 90 parts of methyl methacrylate, and one part of benzoyl peroxide were thoroughly mixed and allowed to stand at room temperature. A hard, transparent, colorless resin resulted, which swells in acetone but does not dissolve.

Example II 20 parts of tetra-allyl pentaerythritol, 80 parts of methyl methacrylate, and one part of benzoyl peroxide were mixed thoroughly and allowed to stand at room temperature. The resulting copolymer was soft and tacky, and it swelled in oeganic solvents such as dioxane or acetone.

Example III 20 parts of allyl starch, 20 parts of vinyl acetate, and 0.5 part of benzoyl peroxide were thoroughly mixed and heated under reflux at 90° C. for 12 hours. The resulting copolymer was hard and insoluble in organic solvents.

Example IV 20 parts of allyl starch, 60 parts of methyl methacrylate, and 0.75 part of benzoyl peroxide were mixed and allowed to stand at room temperature in a closed container. The resulting copolymer was soft, but not tacky; it swelled in aromatic hydrocarbons.

Example V 20 parts of allyl starch, 20 parts of styrene, and 0.5 part of benzoyl peroxide were thoroughly mixed and allowed to stand at room temperature in a closed container. The copolymer product was hard and tough; it swells slightly in acetone.

Example VI 50 parts of tetra-allyl pentaerythritol, 50 parts of methyl methacrylate, and 1 part of benzoyl peroxide were mixed thoroughly and heated at 55° C. The resulting product was transparent, colorless, and tough, and swelled but did not dissolve in acetone.

Example VII 10 parts of tetra-allyl pentaerythritol, 90 parts of vinyl acetate, and 1 part of benzoyl peroxide were mixed thoroughly and allowed to stand at room temperature. The resulting copolymer was soft and crumbly and swelled only in organic solvents such as ethylene chloride, dioxane, and acetone.

Example VIII 20 parts of tetra-allyl pentaerythritol, 80 parts of vinyl acetate, and 1 part of benzoyl peroxide were mixed thoroughly and allowed to stand at room temperature. The resulting copolymer was soft and crumbly and swelled but did not dissolve in organic solvents.

Cross-reference is made to Nichols and Smith application 518,979, filed January 20, 1944 now abandoned, for other types of allyl compounds that may be employed, for example, allyl starches.

Among the types of allyl cellulose or allyl starch that may be employed in the above examples are those described in Hamilton and Nichols application 518,976, filed January 20, 1944, now United States Patent No. 2,406,369.

Dienes such as butadiene, chlorbutadiene, and cyclopentadiene, may be employed.

Having thus described my invention, I claim:

1. A resin comprising a copolymer of 10 to 50 parts of tetra-allyl pentaerythritol and 90 to 50 parts of methyl methacrylate.

2. A resin comprising a copolymer of 10 to 50 parts of tetra-allyl pentaerythritol and 90 to 50 parts of vinyl acetate.

3. A resin comprising a copolymer of 10 to 50 parts of a poly-allyl ether of a polyhydric alcohol, which alcohol has no functional group other than hydroxyl, and 90 to 50 parts of a monomeric polymerizable olefinic compound of the group consisting of acrylic acid esters, methacrylic esters, vinyl esters, and allyl esters having the linkage

4. A resin comprising a copolymer of 10 to 50 parts of tetra-allyl pentaerythritol and 90 to 50 parts of a monomeric polymerizable olefinic compound of the group consisting of acrylic acid esters, methacrylic esters, vinyl esters, and allyl esters having the linkage

5. A process of making a copolymer, comprising reacting 10 to 50 parts of tetra-allyl pentaerythritol and 90 to 50 parts of a monomeric polymerizable olefinic compound of the group consisting of acrylic acid esters, methacrylic esters, vinyl esters, and allyl esters having the linkage

in the presence of a polymerization catalyst of the group consisting of organic and inorganic per compounds.

6. A process of making a copolymer, comprising reacting 10 to 50 parts of poly-allyl ether of polyhydric alcohol, which alcohol has no functional group other than hydroxyl, and 90 to 50 parts of a monomeric polymerizable olefinic compound of the group consisting of acrylic acid esters, methacrylic esters, vinyl esters, and allyl esters having the linkage

in the presence of a polymerization catalyst of the group consisting of organic and inorganic per compounds.

LEE T. SMITH.

REFERENCES CITED

The following references are of record in the file of this patent:

UNITED STATES PATENTS

| Number | Name | Date |
| --- | --- | --- |
| 2,037,740 | Salzberg | Apr. 21, 1936 |
| 2,386,999 | Adelson et al. | Oct. 16, 1945 |

OTHER REFERENCES

Nichols Jr. et al., Article in "Official Digest" Paint and Varnish Production Clubs. March 1945, pp. 111–123.